A. M. HOUSER.
VALVE.
APPLICATION FILED JUNE 17, 1909.
1,187,527.
Patented June 20, 1916.
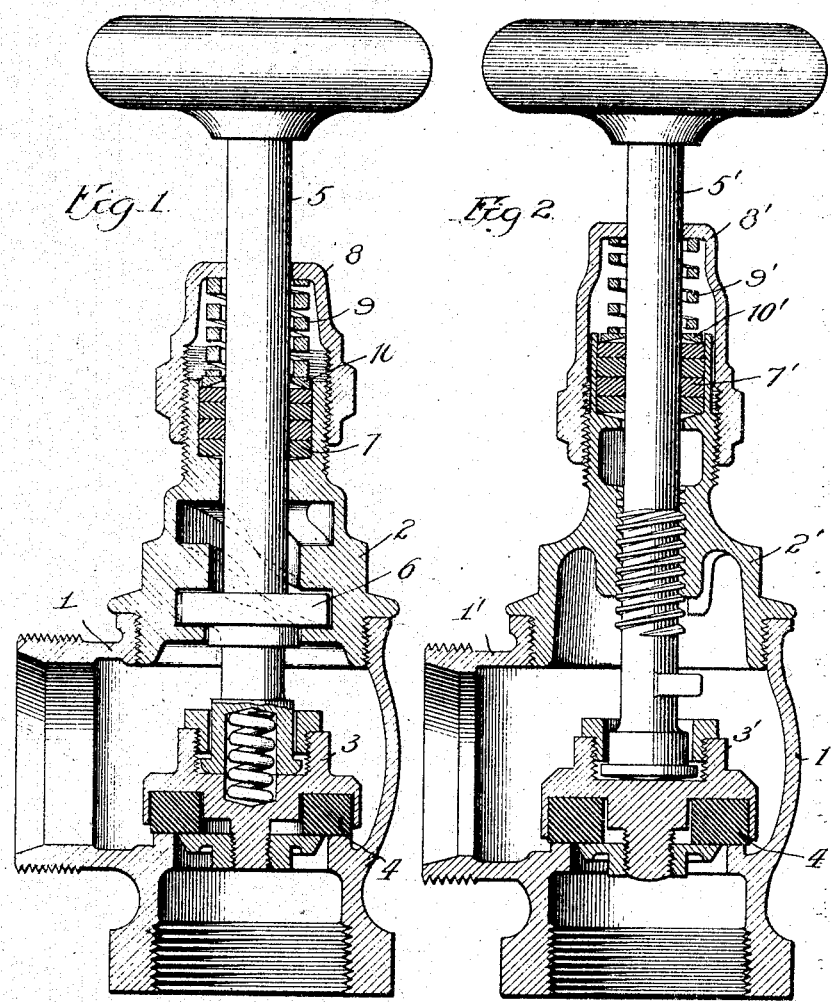
WITNESSES
INVENTOR
Arthur M. Houser

UNITED STATES PATENT OFFICE.

ARTHUR M. HOUSER, OF CHICAGO, ILLINOIS, ASSIGNOR TO CRANE COMPANY, OF CHICAGO, ILLINOIS, A CORPORATION OF ILLINOIS.

VALVE.

1,187,527.  Specification of Letters Patent.  Patented June 20, 1916.

Application filed June 17, 1909. Serial No. 502,751.

*To all whom it may concern:*

Be it known that I, ARTHUR M. HOUSER, a citizen of the United States, residing at Chicago, in the county of Cook and State of Illinois, have invented certain new and useful Improvements in Valves, of which the following is a specification.

The invention relates to valves and particularly to the means for packing the stem. It has for its principal objects; the provision of an improved self packing means for the stem; the provision of an improved combined spring and follower adapted to force the packing against the stem in the most effective manner, and prevent leakage; and the provision of a follower which may be readily removed by the removal of the spring. Certain embodiments of the invention are illustrated in the accompanying drawings, wherein:—

Figure 1 is a longitudinal section through a quick-opening radiator valve equipped with the improved packing means, Figure 2 is a longitudinal section through a modified form of valve equipped with the packing means, and Figure 3 is an enlarged detail sectional view showing the condition of the packing after the valve has been in use for some time.

Referring first to the general arrangement of parts as illustrated in Figure 1, 1 is the valve body; 2 is the bonnet; 3 is the valve provided with the usual composition disk 4; 5 is the valve stem provided with the projecting portion 6 engaging the coarse screw threads upon the interior of the bonnet; 7 is the packing which may be of any approved type, which packing is seated in the recess in the upper portion of the bonnet; 8 is the cap for the bonnet; 9 is the spring for maintaining the packing tightly pressed in its recess; and 10 is a follower ring, preferably of brass soldered to the lower end of the spring and engaging the packing with its lower surface.

The lower end of the recess in which the packing 7 is seated is slightly beveled as indicated in Figures 1 and 3, as is also the under surface of the follower ring 10, so that after the device has been in use for a time and the follower ring becomes crushed down tightly upon the packing such packing assumes the form indicated in Figure 3. It will be seen that the beveled surfaces tend to force the packing inwardly against the stem, thus securing a tight joint about such stem, and preventing any leakage which might otherwise occur. The securing of the follower ring to the spring, thus making a substantially one-piece combined spring and follower is advantageous in that it permits of the ready removal of the follower by merely removing the spring, and any relative rotary movement between the follower and spring is thus avoided, the spring and follower tending to prevent any rotation of the packing, which might otherwise occur if the packing and follower were free to turn independent of the spring. The use of the follower also gives better results than the direct application of the end of the spring to the packing, as the end of the spring being of tempered metal is not readily tapered or beveled, and the spring in some cases is not of sufficient diameter to properly engage the entire upper surface of the packing. The follower ring of comparatively soft metal may be cheaply and easily shaped to the most desirable form, and can be made of sufficient diameter to engage any width of packing.

In Figure 2 the application of the invention to another type of valve is illustrated, 1' being the body portion, 2' being the bonnet, 3' being the disk, 5' being the stem, and 7' being the packing. The spring 9' is somewhat lighter than the spring employed in the other type of valve, but carries at its lower end the follower ring 10' corresponding to the follower ring in the device of Figure 1, such ring being soldered to the lower end of the spring 9'. It will be seen that the invention is applicable to many types of valves other than the one shown.

Having thus described my invention and illustrated its use, what I claim as new and desire to secure by Letters Patent is the following:—

1. The combination in a valve, of a valve body having a threaded stuffing box, a rotary valve stem extending through said stuffing box into the valve body, a compressible packing in said stuffing box, a follower cap threaded onto the threaded portion of the stuffing box, and a spring interposed between said cap and the packing adapted to compress the packing in the stuffing box, thereby preventing rotation of the packing when the stem is turned, the engagement of the spring with the cap being such that the cap may be turned to compress the spring without placing any appreciable torsion on the spring.

2. The combination in a valve, of a valve body having a threaded stuffing box, a rotary valve stem extending through the said stuffing box into the valve body, a compressible packing in said stuffing box, a follower cap threaded onto the threaded portion of the stuffing box, and a spring interposed between said cap and the packing, said spring having a washer portion at the lower end thereof adapted to compress the packing in the stuffing box, thereby preventing rotation of the packing when the stem is turned and preventing relative rotation of the packing and the spring.

3. The combination in a valve, of a valve body having a threaded stuffing box, a rotary valve stem extending through said stuffing box into the valve body, a compressible packing in said stuffing box, a follower cap threaded onto the threaded portion of the stuffing box, and a spring interposed between said cap and the packing, said spring having at its lower end a beveled washer adapted to compress the packing in the stuffing box, thereby preventing rotation of the packing when the stem is turned, the engagement of the spring with the cap being such that the cap may be turned to compress the spring without placing any appreciable torsion on the spring.

4. The combination in a valve, of a valve body having a threaded stuffing box, a rotary valve stem extending through said stuffing box into the valve body, a compressible packing in said stuffing box, a follower cap threaded onto the threaded portion of the stuffing box, and a spring interposed between said cap and the packing, said spring being adapted to compress the packing in the stuffing box, thereby preventing rotation of the packing when the stem is turned, and relative rotation of the spring and packing being prevented by the engagement of the spring with said compressible packing, the said cap being free to rotate relative to the spring whereby the cap may be turned to alter the tension of the spring on the packing without placing the spring under appreciable torsion.

5. The combination in a valve, of a valve body having a threaded stuffing box, a rotary valve stem extending through said stuffing box into the valve body, a compressible packing in said stuffing box, a follower cap threaded onto the threaded portion of said stuffing box, and a spring interposed between said cap and the packing adapted to compress the packing in the stuffing box and prevent rotation of the packing when the valve stem is turned, the follower cap being freely adjustable to alter the tension of the spring on the packing.

In testimony whereof I have hereunto signed my name in the presence of the two subscribed witnesses.

ARTHUR M. HOUSER.

Witnesses:
C. A. SPENCER,
M. W. LINK.